(12) United States Patent
Gil et al.

(10) Patent No.: US 8,204,488 B2
(45) Date of Patent: Jun. 19, 2012

(54) WEB CONTENT DISTRIBUTION TO PERSONAL CELLULAR TELECOMMUNICATIONS DEVICES

(75) Inventors: Amit Gil, Yehud (IL); Eyal Koren, Moshav Herut (IL)

(73) Assignee: Celltick Technologies Ltd., Herzliya (IL)

( * ) Notice: Subject to any disclaimer, the term of this patent is extended or adjusted under 35 U.S.C. 154(b) by 732 days.

(21) Appl. No.: 12/227,973

(22) PCT Filed: Jun. 11, 2007

(86) PCT No.: PCT/IL2007/000700
§ 371 (c)(1),
(2), (4) Date: Dec. 4, 2008

(87) PCT Pub. No.: WO2007/144871
PCT Pub. Date: Dec. 21, 2007

(65) Prior Publication Data
US 2009/0163189 A1    Jun. 25, 2009

(30) Foreign Application Priority Data

Jun. 13, 2006 (IL) .......................................... 176274

(51) Int. Cl.
*H04M 1/725* (2006.01)
(52) U.S. Cl. .................. 455/414.3; 455/403; 455/414.1; 455/414.2; 455/422.1; 455/466; 709/203
(58) Field of Classification Search .................. 455/403, 455/414.1, 414.2, 414.3, 422.1, 466; 709/203, 709/217, 223
See application file for complete search history.

(56) References Cited

U.S. PATENT DOCUMENTS

| | | | |
|---|---|---|---|
| 5,226,177 | A | 7/1993 | Nickerson |
| 5,553,314 | A | 9/1996 | Grube et al. |
| 5,555,446 | A | 9/1996 | Jasinski |
| 5,687,216 | A | 11/1997 | Svensson |
| 5,692,032 | A | 11/1997 | Seppanen et al. |

(Continued)

FOREIGN PATENT DOCUMENTS
EP      0955779      11/1999
(Continued)

OTHER PUBLICATIONS

Office Action issued by the United States Patent and Trademark Office for U.S. Appl. No. 12/452,903 dated Dec. 13, 2011.

(Continued)

*Primary Examiner* — Kamran Afshar
*Assistant Examiner* — Sayed T Zewari
(74) *Attorney, Agent, or Firm* — Pearl Cohen Zedek Latzer, LLP

(57) ABSTRACT

The present invention is directed toward distribution of web content to personal cellular telecommunications devices. The present invention proposes compiling syndicated items compilation files containing the entire contents of one or more syndicated information files and/or status notification compilation files containing a list of one or more syndication feeds and status information regarding same. Both types of compilation files can be Point-To-MultiPoint (P2MP) pushed to all available personal cellular telecommunications devices in one or more cells selected by a cellular operator using standardized P2MP push technology. Alternatively, status notification compilation files can be P2P pulled by or P2P pushed to particular personal cellular telecommunications devices. The present invention also proposes offering accessing full stories in formats other than conventional web page formats. Such non web page formats include inter alia SMS, MMS, email, and the like.

63 Claims, 5 Drawing Sheets

U.S. PATENT DOCUMENTS

| | | | |
|---|---|---|---|
| 5,701,580 | A | 12/1997 | Yamane et al. |
| 5,812,647 | A | 9/1998 | Beaumont et al. |
| 5,822,402 | A | 10/1998 | Marszalek |
| 5,870,030 | A | 2/1999 | DeLuca et al. |
| 5,878,033 | A | 3/1999 | Mouly |
| 5,926,104 | A | 7/1999 | Robinson |
| 5,960,366 | A | 9/1999 | Duwaer |
| 6,018,522 | A | 1/2000 | Schultz |
| 6,060,997 | A | 5/2000 | Taubenheim et al. |
| 6,064,376 | A | 5/2000 | Berezowski et al. |
| 6,169,882 | B1 | 1/2001 | Amma |
| 6,173,316 | B1 | 1/2001 | De Boor et al. |
| 6,212,203 | B1 | 4/2001 | Anderson et al. |
| 6,230,019 | B1 | 5/2001 | Lee |
| 6,298,239 | B1 | 10/2001 | Yonemoto et al. |
| 6,341,228 | B1 | 1/2002 | Hubbe et al. |
| 6,363,419 | B1 | 3/2002 | Martin, Jr. et al. |
| 6,370,389 | B1 | 4/2002 | Isomursu et al. |
| 6,385,461 | B1 | 5/2002 | Raith |
| 6,413,160 | B1 | 7/2002 | Vancura |
| 6,416,414 | B1 | 7/2002 | Stadelmann |
| 6,418,308 | B1 | 7/2002 | Heinonen et al. |
| 6,434,398 | B1 | 8/2002 | Inselberg |
| 6,441,720 | B1 | 8/2002 | Kawashima |
| 6,442,529 | B1 | 8/2002 | Krishan et al. |
| 6,443,840 | B2 | 9/2002 | Von Kohorn |
| 6,484,148 | B1 | 11/2002 | Boyd |
| 6,505,046 | B1 | 1/2003 | Baker |
| 6,522,876 | B1 | 2/2003 | Weiland et al. |
| 6,522,877 | B1 | 2/2003 | Lietsalmi et al. |
| 6,583,714 | B1 | 6/2003 | Gabou et al. |
| 6,615,039 | B1 | 9/2003 | Eldering |
| 6,628,936 | B1 | 9/2003 | Furuya |
| 6,671,715 | B1 | 12/2003 | Langseth et al. |
| 6,688,982 | B2 | 2/2004 | Moodie et al. |
| 6,745,011 | B1 | 6/2004 | Hendrickson et al. |
| 6,807,254 | B1 | 10/2004 | Guedalia et al. |
| 6,832,314 | B1 | 12/2004 | Irvin |
| 6,968,175 | B2 | 11/2005 | Raivisto et al. |
| 6,970,712 | B1 | 11/2005 | Vo |
| 7,003,327 | B1 | 2/2006 | Payne et al. |
| 7,028,261 | B2 | 4/2006 | Smyth et al. |
| 7,039,423 | B2 | 5/2006 | Daniel et al. |
| 7,096,044 | B2 | 8/2006 | Gil et al. |
| 7,113,809 | B2 | 9/2006 | Noesgaard et al. |
| 7,158,753 | B2 | 1/2007 | Kagan et al. |
| 7,181,225 | B1 | 2/2007 | Moton, Jr. et al. |
| 7,191,343 | B2 | 3/2007 | Tuoriniemi et al. |
| 7,219,123 | B1 | 5/2007 | Fiechter et al. |
| 7,251,476 | B2 | 7/2007 | Cortegiano |
| 7,370,283 | B2 | 5/2008 | Othmer |
| 7,551,913 | B1 | 6/2009 | Chien |
| 7,551,919 | B2 | 6/2009 | Cortegiano |
| 7,561,899 | B2 | 7/2009 | Lee |
| 7,689,167 | B2 | 3/2010 | Sengupta et al. |
| 7,747,264 | B2 | 6/2010 | Fiorini |
| 7,752,209 | B2 | 7/2010 | Ramer et al. |
| 7,779,023 | B2 | 8/2010 | Smyth et al. |
| 7,801,541 | B2 | 9/2010 | Daniel et al. |
| 7,860,951 | B2 | 12/2010 | Gil et al. |
| 2001/0003099 | A1 | 6/2001 | Von Kohorn |
| 2001/0020957 | A1 | 9/2001 | Ringot |
| 2002/0054090 | A1 | 5/2002 | Silva et al. |
| 2002/0138331 | A1 | 9/2002 | Hosea et al. |
| 2003/0005466 | A1 | 1/2003 | Liao |
| 2003/0013439 | A1 | 1/2003 | Daniel et al. |
| 2003/0065706 | A1 | 4/2003 | Smyth et al. |
| 2003/0181201 | A1 | 9/2003 | Bomze et al. |
| 2003/0191653 | A1 | 10/2003 | Birnbaum et al. |
| 2003/0229534 | A1 | 12/2003 | Frangione et al. |
| 2004/0049419 | A1 | 3/2004 | Knight |
| 2004/0077340 | A1 | 4/2004 | Forsyth |
| 2004/0078427 | A1 | 4/2004 | Gil et al. |
| 2004/0127199 | A1 | 7/2004 | Kagan et al. |
| 2004/0157628 | A1 | 8/2004 | Daniel et al. |
| 2005/0015307 | A1 | 1/2005 | Simpson et al. |
| 2005/0060370 | A1 | 3/2005 | Xue et al. |
| 2005/0149618 | A1 | 7/2005 | Cheng |
| 2005/0154996 | A1* | 7/2005 | Othmer .................. 715/774 |
| 2005/0213511 | A1 | 9/2005 | Reece, Jr. et al. |
| 2005/0222908 | A1 | 10/2005 | Altberg et al. |
| 2006/0004627 | A1 | 1/2006 | Baluja |
| 2006/0030370 | A1 | 2/2006 | Wardimon |
| 2006/0064350 | A1 | 3/2006 | Freer |
| 2006/0069611 | A1 | 3/2006 | Litt et al. |
| 2006/0160578 | A1 | 7/2006 | Daniel et al. |
| 2006/0190616 | A1 | 8/2006 | Mayerhofer et al. |
| 2006/0204944 | A1 | 9/2006 | Preskill |
| 2006/0234696 | A1 | 10/2006 | Cho |
| 2007/0021065 | A1 | 1/2007 | Sengupta et al. |
| 2007/0055565 | A1 | 3/2007 | Baur et al. |
| 2007/0106557 | A1 | 5/2007 | Varghese |
| 2007/0123246 | A1 | 5/2007 | Daniel et al. |
| 2007/0178889 | A1 | 8/2007 | Cortegiano et al. |
| 2007/0203801 | A1 | 8/2007 | Istfan |
| 2007/0218865 | A1 | 9/2007 | Daniel et al. |
| 2007/0218882 | A1 | 9/2007 | Daniel et al. |
| 2007/0218919 | A1 | 9/2007 | Ozulkulu et al. |
| 2007/0276729 | A1 | 11/2007 | Freer |
| 2007/0288856 | A1 | 12/2007 | Butlin et al. |
| 2008/0021783 | A1 | 1/2008 | Varghese |
| 2008/0091518 | A1 | 4/2008 | Eisenson et al. |
| 2008/0139224 | A1 | 6/2008 | Stone |
| 2008/0160956 | A1 | 7/2008 | Jackson et al. |
| 2008/0160970 | A1 | 7/2008 | Srinivas Reddy et al. |
| 2008/0187112 | A1 | 8/2008 | Koberstein et al. |
| 2009/0150400 | A1 | 6/2009 | Abu-Hakima et al. |
| 2009/0163189 | A1 | 6/2009 | Gil et al. |
| 2010/0016025 | A1 | 1/2010 | Koren et al. |
| 2010/0081462 | A1 | 4/2010 | Neria et al. |
| 2010/0130196 | A1 | 5/2010 | Gil et al. |
| 2010/0312643 | A1 | 12/2010 | Gil |
| 2011/0098091 | A1 | 4/2011 | Daniel et al. |

FOREIGN PATENT DOCUMENTS

| | | |
|---|---|---|
| GB | 2320600 | 6/1998 |
| GB | 2327567 | 1/1999 |
| GB | 2362550 | 11/2001 |
| GB | 2391363 | 2/2004 |
| WO | WO 98/10604 | 3/1998 |
| WO | WO 98/41013 | 9/1998 |
| WO | WO 99/42964 | 8/1999 |
| WO | WO 00/22906 | 4/2000 |
| WO | WO 00/77979 | 12/2000 |
| WO | WO 01/45317 | 6/2001 |
| WO | WO 01/52558 | 7/2001 |
| WO | WO 01/52572 | 7/2001 |
| WO | WO 02/087267 | 10/2002 |

OTHER PUBLICATIONS

Global System for Mobile Communications, Digital Cellular Telecommunications System (Phase 2+) (GSM); Universal Mobile Telecommunications System (UMTS); USIM Application Toolkit (USAT); (3 GPP TS 31.111 (Dec. 2000) version 3.3.0; 1999); pp. 1-136.

Gromakiv, "Mobile Wireless Communication Standards and Systems", Mobile TeleSystems-EcoTrands, (1997), Chapter 4, pp. 67-70, with English translation.

Afanasev, et al., "Evolution of Mobile Networks", (Inventory #5554), Moscow, 2001, pp. 84-87 with English translation.

Office Action issued by the United States Patent and Trademark Office for U.S. Appl. No. 11/798,571 dated Jan. 25, 2010.

Office Action issued by the United States Patent and Trademark Office for U.S. Appl. No. 11/798,571 dated Jun. 28, 2010.

Office Action issued by the United States Patent and Trademark Office for U.S. Appl. No. 11/798,571 dated Dec. 23, 2010.

Office Action issued by the United States Patent and Trademark Office for U.S. Appl. No. 11/798,571 dated Oct. 14, 2011.

Office Action issued by the United States Patent and Trademark Office for U.S. Appl. No. 12/982,686 dated May 2, 2011.

Office Action issued by the United States Patent and Trademark Office for U.S. Appl. No. 11/385,650 dated Jun. 26, 2008.

Office Action issued by the United States Patent and Trademark Office for U.S. Appl. No. 11/385,650 dated Jan. 26, 2009.

Office Action issued by the United States Patent and Trademark Office for U.S. Appl. No. 11/385,650 dated Jun. 8, 2009.
Office Action issued by the United States Patent and Trademark Office for U.S. Appl. No. 11/798,572 dated Jun. 25, 2010.
Office Action issued by the United States Patent and Trademark Office for U.S. Appl. No. 11/798,572 dated Jan. 19, 2010.
Office Action issued by the United States Patent and Trademark Office for U.S. Appl. No. 11/798,572 dated Jan. 21, 2011.
Office Action issued by the United States Patent and Trademark Office for U.S. Appl. No. 11/798,572 dated Oct. 14, 2011.
Office Action issued by the United States Patent and Trademark Office for U.S. Appl. No. 12/223,806 dated Jun. 28, 2011.
Office Action issued by the United States Patent and Trademark Office for U.S. Appl. No. 12/448,254 dated Jul. 25, 2011.
Office Action issued by the United States Patent and Trademark Office for U.S. Appl. No. 12/448,211 dated Aug. 18, 2011.
Office Action issued by the United States Patent and Trademark Office for U.S. Appl. No. 12/448,254 dated Jan. 5, 2012.
Office Action issued by the United States Patent and Trademark Office for U.S. Appl. No. 12/982,686 dated Jan. 12, 2012.

* cited by examiner

```
┌─────────────────────────────────────────────┐
│ SUCCESSFUL SPACE PROBE                      │   16A
│ NEW CONCERNS REGARDING GLOBAL WARMING       │
│ NEW INTERNET VIRUS CAUSING HAVOC            │
└─────────────────────────────────────────────┘

┌─────────────────────────────────────────────┐
│ 25 COUNTRIES STOP ACCESS TO GOOGLE          │   16B
│ GENE THERAPY TO STOP BALDING                │
│ MICROSOFT ANNOUNCES NEW OPERATING SYSTEM    │
│ GREEN CARS MAKING INROADS                   │
└─────────────────────────────────────────────┘

┌─────────────────────────────────────────────┐
│ MICROSOFT SUED BY PRIVATE INVENTOR          │   16C
│ USPTO TO RAISE THE PATENTABILITY BAR        │
│ EPO GRANTS SOFTWARE PATENTS                 │
└─────────────────────────────────────────────┘
```

FIG.2

```
┌─────────────────────────────────────────────┐
│ SUCCESSFUL SPACE PROBE                      │   19
│ NEW CONCERNS REGARDING GLOBAL WARMING       │
│ NEW INTERNET VIRUS CAUSING HAVOC            │
│ 25 COUNTRIES STOP ACCESS TO GOOGLE          │
│ GENE THERAPY TO STOP BALDING                │
│ MICROSOFT ANNOUNCES NEW OPERATING SYSTEM    │
│ GREEN CARS MAKING INROADS                   │
│ MICROSOFT SUED BY PRIVATE INVENTOR          │
│ USPTO TO RAISE THE PATENTABILITY BAR        │
│ EPO GRANTS SOFTWARE PATENTS                 │
└─────────────────────────────────────────────┘
```

FIG.3

```
┌──────────────────────────────────────────────────┐
│ TOP STORIES:       20 MAY 2007 14:00  THREE ITEMS│   21
│ SCIENCE STORIES:   20 MAY 2007 13:00  FOUR ITEMS │
│ IP NEWS:           20 MAY 2007 12:00  THREE ITEMS│
└──────────────────────────────────────────────────┘
```

FIG.4

WEB CONTENT DISTRIBUTION TO PERSONAL CELLULAR TELECOMMUNICATIONS DEVICES

CROSS-REFERENCE TO RELATED APPLICATIONS

This application is the national phase of International Application Serial Number PCT/IL2007/000700 filed 11 Jun. 2007 designating the United States and published in English, the entire contents of which is incorporated herein in its entirety by reference.

FIELD OF THE INVENTION

The invention pertains to distribution of web content to personal cellular telecommunications devices. For the purpose of the present invention, the term "personal cellular telecommunications device" refers to a wide range of portable handheld electronic devices having small display screens and voice communications capabilities. The term "personal cellular telecommunications device" is intended to include inter alia radio telephones, smart phones, communicators, and the like.

BACKGROUND OF THE INVENTION

Many websites including almost all major news websites and many smaller websites now provide syndication feeds for facilitating distribution of web content including inter alia text, multimedia, and the like, to desktop computers and personal cellular telecommunications devices. Major news websites tend to maintain a webpage listing syndication feeds covering different topics such as top stories, sport news, financial news, and the like. Syndication feeds each have a unique syndication feed URL at which their most recently updated syndicated information files are available. Syndicated information files are formatted in one of several formats including inter alia RSS (Really Simple Syndication), Atom, and the like. Syndicated information files typically contain syndicated information in the form of short syndicated items and embedded URLs for accessing full stories including inter alia text, multimedia, and the like. Syndication feeds are intended to be updated but update rates vary considerably: some syndication feeds are frequently updated whilst others are irregularly and/or infrequently updated. Syndicated information files typically include an update parameter for specifying its last update, for example, last update time, last update identification serial number, file content checksum, and the like. Syndicated information files are typically several kilobytes in size.

Distribution of web content to users originating from syndication feeds involves two types of Point-To-Point (P2P) Internet pull transactions as follows:

(a) So-called P2P syndicated information pull transactions for fetching syndicated information files from selected syndication feed URLs. So-called feed readers execute syndicated information pull transactions and process syndicated information files for organizing their syndicated items for user review prior to users selectively accessing full stories of syndicated items which they are interested in. Suitable feed readers include inter alia Feedreader available from http://www.feedreader.com. Feed reader processing includes updating new syndicated items, deleting old syndicated items, sorting syndicated items, and the like. Users can manually invoke feed readers to individually browse to particular syndication feed URLs but typically prefer to configure feed readers to automatically browse to a preconfigured list of syndication feeds, for example, directed to top stories, and work and/or pastime related syndication feeds. Feed readers enable configuring different profiles for different syndication feeds in terms of update period, archive size for storing syndicated items, and the like. Users tend to configure their feed readers to execute syndicated information pull transactions more frequently than the update rates at most of the syndication feeds in which they are interested to minimize delays between updates and their feed readers having the most recent syndicated information files. Thus, many syndicated information pull transactions are a posteriori spurious insofar that they do not contain any new syndicated items. Moreover, most users typically review the contents of their feed readers once or twice a day but have a tendency to configure their feed readers to execute syndicated information pull transactions far more frequently, thereby effectively resulting in a posteriori many wasted fetches of syndicated information files.

(b) So-called P2P full story pull transactions for accessing full stories of syndicated items of interest to users. The full stories can be located at syndication feeds themselves or other internet websites. Browsers execute the full story pull transactions and optionally invoke plug-ins including inter alia media players, and the like, to render full stories as appropriate. Feed readers may also include built-in browsers.

Syndication feeds are enjoying increasing popularity amongst desktop computer users partly by virtue that as a pull technology users don't need to register or leave personal information in order to receive updates. This steadily increasing volume of syndicated information pull transactions is beginning to strain syndication feeds and the transportation networks for transporting the syndicated information pull transactions to users. This load is further compounded due to the fact that users have a tendency to "oversubscribe" to syndication feeds, namely, they configure their feed readers to browse to more syndication feeds than they generally have time to review their syndicated items.

Syndication feeds are also enjoying increasing popularity amongst cellular users by virtue of cellular networks having greater bandwidth and the wider availability of personal cellular telecommunications devices capable of supporting feed readers and browsers. However, the steadily increasing volume of syndicated information pull transactions particularly affects cellular data network Quality of Service (QoS) and personal cellular telecommunications devices in terms of power consumption, processing speed, and the like. Moreover, cellular users face an additional problem due to the fact that personal cellular telecommunications devices access full stories in web page formats which preclude them from saving full stories for future retrieval or forwarding to other cellular users such that they have to save or forward links to the full stories. Such web page formats include inter alia WAP, HTML and equivalents such as XHTML, cHTML, and similar technologies.

SUMMARY OF THE INVENTION

Generally speaking, the present invention is directed toward facilitating web content distribution to personal cellular telecommunications devices (hereinafter abbreviated to "devices") each having feed reader functionality and browser functionality to benefit the entire web content supply chain, namely, syndication feed providers, cellular operators and cellular users. The present invention proposes deploying a compilation server for periodically executing P2P syndicated information pull transactions at one or more syndication feeds in a conventional manner for periodically compiling one or two types of compilation files for transmitting to personal cellular telecommunications devices for provisioning cellular users with the most recent syndicated information files available at syndication feeds but lessening the present need for mass fetching of syndicated information files on an individual typically automatic basis. It should be noted though that cellular users are still free to individually fetch syndicated information files in the conventional manner irrespective of whether they are receiving compilation files. Compilation servers can periodically prepare single compilation files covering a wide range of topics or alternatively several compilation files each dedicated towards a different topic, for example, top stories, sport news, financial news, and the like. Users can place requests that syndication feeds be added to lists of syndication feeds interrogated by compilation servers. Alternatively, compilation servers can sniff syndication feeds from which syndicated information files are fetched by conventional P2P syndicated information pull transactions.

The present invention necessarily involves provisioning personal cellular telecommunications devices with suitable feed reader functionality for receiving and processing both conventional syndicated information files and compilation files for enabling users to access full stories. Cellular users are preferably offered access to full stories in non web page formats in addition to conventional web page formats. Suitable non web page formats include inter alia SMS, MMS, email and the like. Such non web page formats are more suitable for storing in memory for later rendering, forwarding to other cellular users thereby acting as a revenue source for cellular operators, and the like. The envisaged feed reader functionality for receiving and processing compilation files of the present invention can be afforded by a dedicated feed reader with or without built-in browser functionality. Alternatively, devices operative for displaying interactive display messages during idle time as illustrated and described in Applicant's PCT International Publication No. WO 01/52572, the contents of which are incorporated herein by reference, can be provisioned with suitable feed reader functionality and browsing functionality. Accordingly, the devices preferably operate silently to receive and process syndicated information files and/or compilation files including displaying information instead of an idle screen for user review, and delete them irrespective of whether they were displayed or not. Applicant's market commercial implementations of the idle screen invention published under WO 01/52572 under the trade name LIVESCREEN™. Online information of the idle screen invention is available at www.celltick.com.

The present invention envisages two types of compilation files as follows:

Syndicated Items Compilation Files

Syndicated items compilation files contain syndicated items compiled from one or more syndicated information files and are intended for Point-To-MultiPoint (P2MP) pushing to all available devices in one or more cells selected by a cellular operator. Compilation servers are preferably programmed to run a comparison check to determine which syndication feeds have been updated since the last fetching of their syndicated information files before compiling a syndicated items compilation file. Such comparison checks are preferably executed on a regular basis, say, once an hour on the hour. Compilation servers can be programmed to compile syndicated items compilation files from the same predetermined list of syndication feeds if one or more of the syndication feeds from which they are fetching their most recent syndicated information files has been updated. Alternatively, compilation servers can be programmed to compile syndicated items compilation files containing only syndicated items from syndication feeds which have been updated since the last fetching of most recent syndicated information files to reduce their size. Consequently, consecutively compiled syndicated items compilation files may be partially or wholly different depending on compilation strategy and the update rates at the different syndication feeds from which syndicated information files are being fetched. The same syndicated items compilation file can be transmitted several times to increase the likelihood that it is received. Moreover, feed reader functionalities can include a log of when they receive syndicated items compilation files such that cellular users can be informed of same before deciding to individually fetch a syndicated information file from a syndication feed polled by a compilation server. Individually fetched syndicated information files will either be the same version as the latest version fetched by a compilation server or a newer version in the case that a syndication feed was updated after the last fetch by the compilation server. Feed reader functionality is programmed to process the syndicated items of the most recent syndicated information file available at a syndication feed irrespective of whether they are received in a syndicated items compilation file or an individually fetched syndicated information file. It is envisaged that the vast majority of syndicated items from most recent syndicated information files available at syndication feeds will be automatically brought to feed readers in syndicated items compilation files thereby reducing the number of P2P syndicated information pull transactions executed by personal cellular telecommunications devices to reduce the load along the entire web content supply chain.

Status Notification Compilation Files

Status notification compilation files contain a list of one or more syndication feeds together with status information regarding same, for example, last update time, last update identification serial number, file content checksum, and the like, for enabling convenient determination at individual personal cellular telecommunications devices whether or not their feed reader functionality has processed the most recent syndicated information files available at one or more selected syndication feeds. Status notification compilation files are intended to be frequently compiled, for example, every five minutes, and can be either P2P pulled by particular devices or P2P pushed to particular devices or P2MP pushed to all available devices in one or more cells selected by a cellular operator. The same status notification compilation file can be P2P or P2MP pushed several times to increase the likelihood that it is received. Such status notification compilation files have the benefit of being typically much smaller than syndicated information files and are intended for relatively quick compilation and transmission to cellular users whilst consuming minimal transmission resources. Such status notification compilation files can contain status information regarding the same list of syndication feeds irrespective of whether some or all of the syndication feeds have or have not been updated since the last fetching of their most recent syndicated information files. Alternatively, status notification compilation files can contain status information regarding syndication feeds which have been updated since the last fetching of their most recent syndicated information files only.

Status information regarding syndication feeds can be processed at personal cellular telecommunications devices in one of several operational modes which may be under user control at their personal cellular telecommunications devices. For example, feed reader functionality may automatically fetch the most recent syndicated information files available at selected syndication feeds. Some cellular users may select to be advised regarding such fetching such that they are continuously informed regarding the status of the syndicated information files held at their feed reader functionality. Alternatively, some cellular users may request that their feed reader functionality request user authorization before automatically fetching syndicated information files so that they may decline fetching a syndicated information file, for example, in the case that they know that they won't have the time to review its syndicated items. Alternatively, some cellular users may prefer that they be prompted with a list of one or more syndication feeds which have more recent syndicated information files available than those most recently processed by their personal cellular telecommunications devices whereupon they can decide if they want to fetch one or more of them. It is envisaged that the status notification compilation files of the present invention will afford cellular users the feeling that they have more hands on control over the operation of their feed reader functionality and will more selectively fetch most recent syndicated information files available at syndication files compared to the present automatic mass fetching of syndicated information files irrespective of whether cellular users are likely to review them in the near future or not. Thus, it is envisaged that the status notification compilation files of the present invention will also assist reducing the number of P2P syndicated information pull transactions executed by personal cellular telecommunications devices to reduce the load along the entire web content supply chain.

P2MP pushing of a single message simultaneously to all available devices in a cell is a standard feature of several cellular technologies having different terms for the same technological capability. For example, Cell Broadcast as defined by official standardization bodies such as GSM and 3GPP as well as its equivalent Broadcast SMS defined in 3GPP2 and IS95CDMA. Also, Multimedia Broadcast and Multi-Cast Service (MBMS/BCMCS) as defined by the 3GPP/3GPP2 official standardization body, DVB-H (Digital Video Broadcast—Handheld), DMB (Digital Media Broadcast) MediaFLO, and others. However, it should be noted that P2MP push technology is not without disadvantages since devices will only receive messages on the condition that they are physically located in a cell in which messages are being P2MP pushed, they are powered up and enabled to receive messages over a P2MP push capability. Similarly, the disadvantages also apply to P2P pushing to particular personal cellular telecommunications devices. For example, cellular users will not receive compilation files when they are abroad or have temporarily disabled their devices, for example, in a meeting. And second, cellular users will typically receive compilation files less frequently than the present frequency of syndicated information pull transactions due to compilation time, longer transmission times due to typically larger size of syndicated items compilation files, and the like. These disadvantages can be partially offset by repeatedly P2P/P2MP pushing the same compilation file over, say, a 15 minute period and/or personal cellular telecommunications devices being configured to execute conventional P2P syndicated information pull transactions in the case that they don't receive compilation files for longer than a predetermined time interval.

BRIEF DESCRIPTION OF THE DRAWINGS

In order to understand the invention and to see how it can be carried out in practice, preferred embodiments will now be described, by way of non-limiting examples only, with reference to the accompanying drawings in which similar parts are likewise numbered, and in which:

FIG. 2 is a schematic representation of the most recent syndicated information files available at FIG. 1's three syndication feeds;

FIG. 3 is a schematic representation of a syndicated items compilation file containing the syndicated items of the most recent syndicated information files available at FIG. 1's three syndication feeds;

FIG. 4 is a schematic representation of a status notification compilation file containing a list of FIG. 1's three syndication feeds and status information regarding same;

DETAILED DESCRIPTION OF PREFERRED EMBODIMENTS OF THE PRESENT INVENTION

Figure 1:
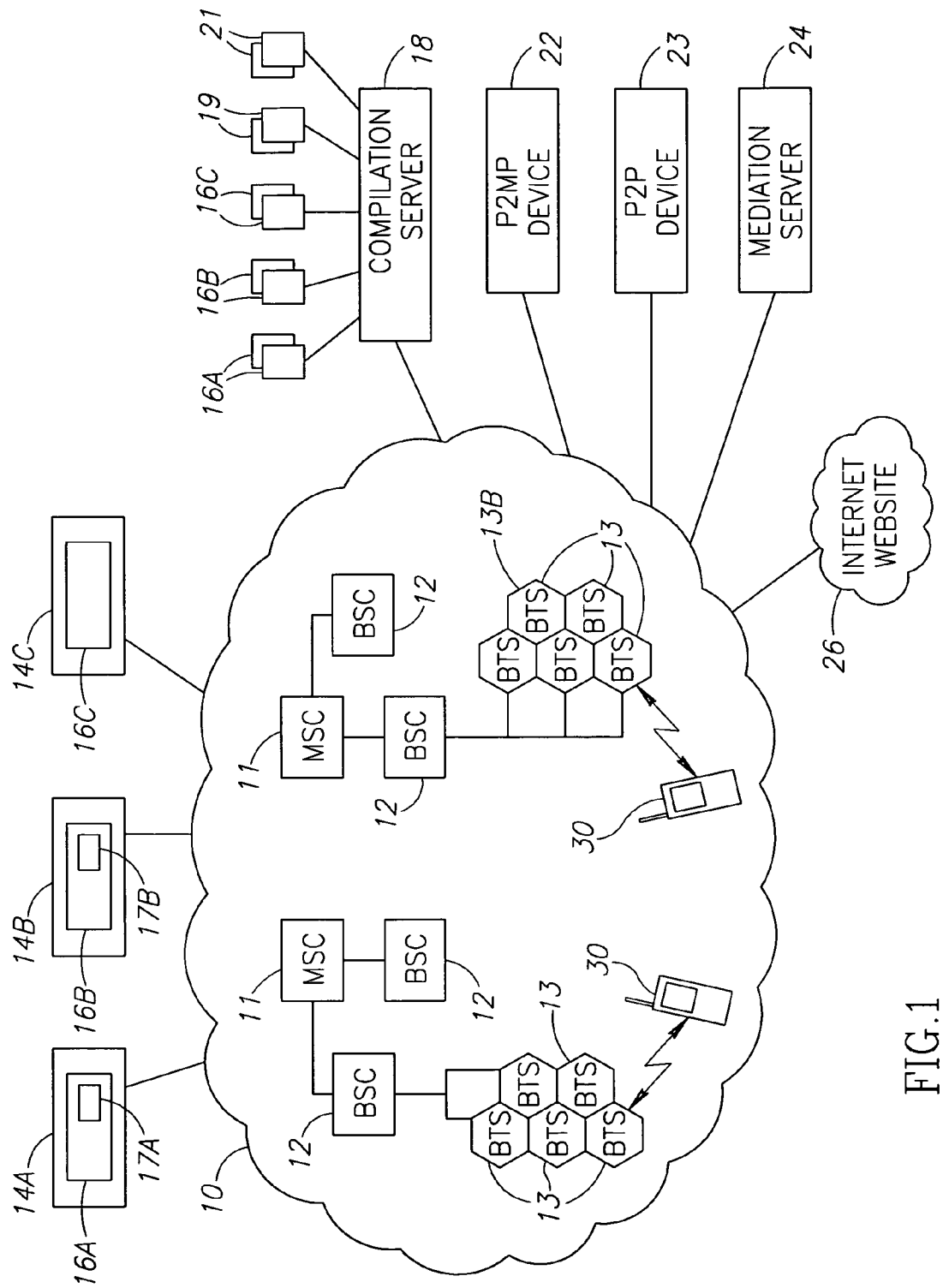
FIG. 1 is a schematic diagram of a cellular telecommunications network for distributing web content to personal cellular telecommunications devices in accordance with the present invention and three syndication feeds directed toward top stories, science news, and IP news.

FIG. 1 show a cellular telecommunications network 10 including a plurality of Mobile Switching Centers (MSCs) 11, a plurality of Base Station Controllers (BSCs) 12, and a plurality of individually addressable Base Transceiver Stations (BTSs) 13 each providing bidirectional signal coverage to personal cellular telecommunications devices (hereinafter abbreviated to "devices") 30 over predefined geographical areas ranging from so-called indoor pico cells each covering a few square meters through so-called micro cells each covering anywhere from a few tens of to a few hundreds of square meters up to cells covering several square kilometers. The cellular telecommunications network 10 is in communication with three syndications feeds 14A, 14B and 14C respectively directed towards top stories, science news, and IP news. The devices 30 include inter alia simple handset phones, smartphones, combined PDA/phones, combined MP3 music players/phones, and the like.

The syndications feeds 14A, 14B and 14C each have a unique syndication feed URL at which their respective most recently updated syndicated information files 16A, 16B, and 16C are available. The syndicated information files 16 contain syndicated information including short syndicated items and embedded URLs for accessing full stories including inter alia text, multimedia, and the like. The syndicated information file 16A includes an update parameter 17A specifying a last update of 20 May 2007 14:00. The syndicated information file 16B includes an update parameter 17B specifying a last update of 20 May 2007 13:00. The syndicated information file 16C does not have an update parameter.

The cellular telecommunications network 10 includes a compilation server 18 for executing Point-To-Point (P2P) syndicated information pull transactions at syndication feeds 14 for fetching most recent syndicated information files 16. The compilation server 18 stores the most recent syndicated information files 16 and the last fetched syndicated information files 16 for processing purposes described herein below. The compilation server 18 compiles either syndicated items compilation files 19 containing syndicated items from one or more syndicated information files 16 and/or status notification compilation file 21 containing a list of syndication feeds and status information regarding same for enabling convenient determination at individual devices 30 whether or not they have processed the most recent syndicated information files 16 available at one or more selected syndication feeds 14. Status information can also include the number of syndicated items in the most recent syndicated information files 16 available at syndication feeds 14, and the like.

The compilation server 18 determines values for update parameters for syndicated information files 16 which are not provided with an update parameter by their syndication feed providers for use in compiling status notification compilation files 21. The compilation server 18 preferably determines the values of the update parameters for a syndicated information file 16 by comparing the most recent syndicated information file 16 available at a syndication feed 14 to the last fetched syndicated information file 16 from the same syndication feed 14. If the most recent syndicated information file 16 available at a syndication feed 14 is identical to the last fetched syndicated information file 16 from the same syndication feed 14, then the syndication feed 14 has not been updated in the interim since the last fetching of its syndicated information file 16. Therefore, the compilation server 18 assigns values to update parameters corresponding to the times of its fetching syndicated information files 16. In the present instance, the compilation server 18 has assigned the update value of 20 May 2007 12:00 to the syndicated information file 16C.

FIG. 2 shows the syndicated information file 16A includes three syndicated items: SUCCESSFUL SPACE PROBE; NEW CONCERNS REGARDING GLOBAL WARMING; and NEW INTERNET VIRUS CAUSING HAVOC. FIG. 2 also shows the syndicated information file 16B includes four syndicated items: 25 COUNTRIES STOP ACCESS TO GOOGLE; GENE THERAPY TO STOP BALDING; MICROSOFT ANNOUNCES NEW OPERATING SYSTEM; and GREEN CARS MAKING INROADS. FIG. 2 also shows the syndicated information file 16C includes three syndicated items: MICROSOFT SUED BY PRIVATE INVENTOR; USPTO TO RAISE THE PATENTABILITY BAR; and EPO GRANTS SOFTWARE PATENTS.

FIG. 3 shows a syndicated items compilation file 19 containing the ten syndicated items of the syndicated information files 16A, 16B and 16C.

FIG. 4 shows a status notification compilation file 21 including a list of the three syndication feeds 14A, 14B and 14C, and also the values of the update parameters 17A and 17B and the assigned value of 20 May 2007 12:00 for the syndicated information file 16C. The status notification compilation file 21 preferably includes the number of syndicated items in the most recent syndicated information files 16A, 16B and 16C, namely, three, four and three, respectively.

The compilation server 18 preferably stores historical syndicated items compilation files 19 and historical status notification compilation files 21 for statistical analysis purposes, for example, the number of syndicated items, frequency and regularity of updates, and the like.

The cellular telecommunications network 10 includes a Point-To-MultiPoint (P2MP) device 22 for P2MP pushing of syndicated items compilation files 19 and/or status notification compilation files 21 to all available devices 30 in one or more cells selected by a cellular operator. The cellular telecommunications network 10 includes a Point-To-Point (P2P) device 23 for enabling P2P pulling of status notification compilation files 21 by particular devices 30 and/or or P2P pushing of status notification compilation files 21 to particular devices 30.

Figure 6:
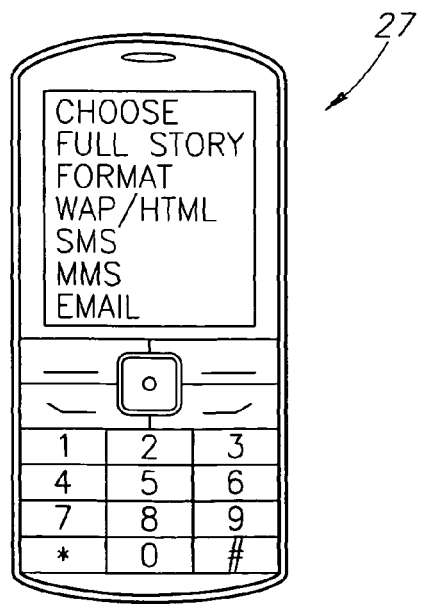
FIG. 6 is a schematic representation of a personal cellular telecommunications device displaying a display image displaying at least two different formats including at least one non web page format for accessing a full story for enabling a user to select a preferred format for accessing a full story.

The cellular telecommunications network 10 is in communication with a mediation server 24 capable of providing non web page formats of full stories available at syndication feeds 14 or other internet websites 26. Suitable non web page formats include inter alia SMS, MMS, e-mail, and the like. The non web page formats are preferably displayed in a display image 27 displaying at least two different formats including at least one non web page format for enabling a user to select a preferred format for accessing a full story (see FIG. 6). Suitable display images include a menu listing two or more formats requiring a user to scroll to his preferred format, user commands indicating particular pushkeys for each selecting a preferred format, and the like.

Figure 5:
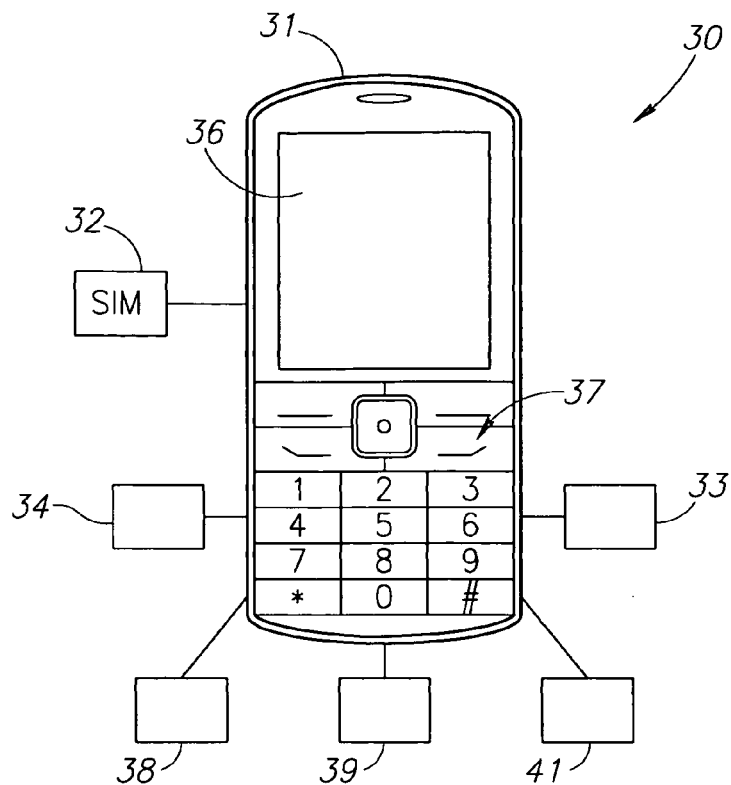
FIG. 5 is a schematic representation of a personal cellular telecommunications device with feed reader functionality and browser functionality in accordance with the present invention.

FIG. 5 shows a GSM device 30 including a host Mobile Equipment (ME) 31, and a resident Subscriber Identity Module (SIM) card 32. The host ME 31 has its own unique vendor allocated 15 digit International Mobile Equipment Identification (IMEI) number, for example, 490548400308362. The SIM card 32 has a cellular operated allocated 15 digit International Mobile Subscriber Identity (IMSI) number, for example, 425010100437187, and is capable of storing SIM toolkit client applications. The device 30 include a cellular network interface 33 for bidirectional interfacing with the cellular telecommunications network 10, an operating system 34 in communication with the cellular network interface 33, a display screen 36, a user interface 37 for inputting instructions, and a memory unit 38.

The device 30 includes feed reader functionality 39 for receiving and processing conventional syndicated information files 16, syndicated items compilation files 19 and status notification compilation files 21 for displaying syndicated items and/or compilation information on the display screen 36. The device 30 includes browser functionality 41 for accessing full stories in web page format for rendering thereon. The device 30 can be installed with a dedicated feed reader providing the feed reader functionality 39 and a dedicated browser for providing the browser functionality 41. The device 30 can be installed with a dedicated feed reader with a built-in browser for providing both the feed reader functionality 39 and the browser functionality 41. The feed reader functionality 39 and/or the browser functionality 41 can be provided as part of the device 30, for example, as a native application, Symbian application, J2ME application and the like, or as a SIM toolkit client application residing on the SIM card 32.

Figure 7:
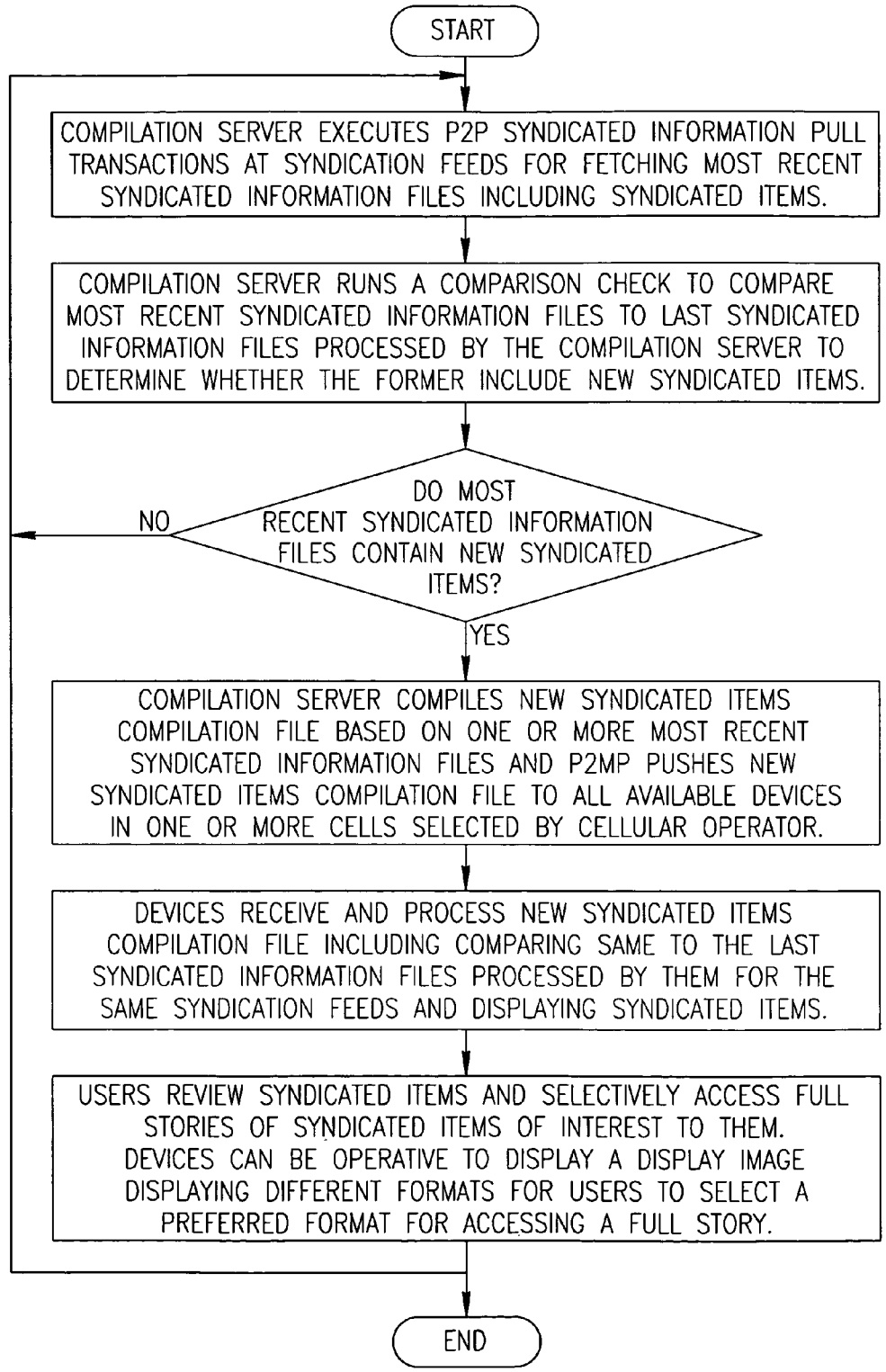
FIG. 7 is a flow diagram of a method for initiating consumption of web content from FIG. 3's syndicated items compilation file intended for P2MP pushing to all available devices in one or more cells selected by a cellular operator.

FIG. 7 shows the steps for enabling consumption of web content from syndicated items compilation files intended for P2MP pushing to all available devices in one or more cells selected by a cellular operator. The compilation server executes P2P syndicated information pull transactions at syndication feeds for fetching the most recent syndicated information files. The compilation server preferably runs a comparison check to compare the most recent syndicated information files available at syndication feeds to the last fetched syndicated information files to determine whether the former contain new syndicated information which may be of interest to users. In the negative, the compilation server does not need to prepare a new syndicated items compilation file since its compilation information would be identical to that of an immediately preceding syndicated items compilation file. In the affirmative, the compilation server compiles a new syndicated items compilation file containing new compilation information with respect to its immediately preceding syndicated items compilation file ready for P2MP pushing to all available devices in one or more cells selected by the cellular operator of the cellular telecommunications network. For example, if the last comparison check of the most recent syndicated information files 16A, 16B and 16C was run at 20 May 2007 13:30, the only syndication feed which was updated since the last compilation is the syndication feed 14A directed towards top stories. The new syndicated items compilation file may contain syndicated items from all three syndication feeds or just the syndicated items from the syndication feed 14A's most recent syndicated information file 16A.

The devices receive and process new syndicated items compilation files in the same manner as a conventional syndicated information file. However, the devices may receive syndicated items compilation files which contain syndicated items which have already been received by virtue of the fact that users can still optionally invoke their devices to execute P2P syndicated information pull transactions in a conventional manner irrespective of whether they have or have not recently received a compilation file. Accordingly the devices compare the syndicated items received in syndicated items compilation files to the last syndicated information files received and processed for the same syndication feeds to determine the syndication feeds having recently updated syndicated information files including syndicated items not yet seen by users. Users review the syndicated items and selectively execute P2P full story pull transactions for accessing full stories of the syndicated items of interest to them for rendering on their devices. The devices can be operative to display a display image displaying at least two different formats including at least one non web page format for enabling users to select a preferred format for accessing a full story.

Figure 8:
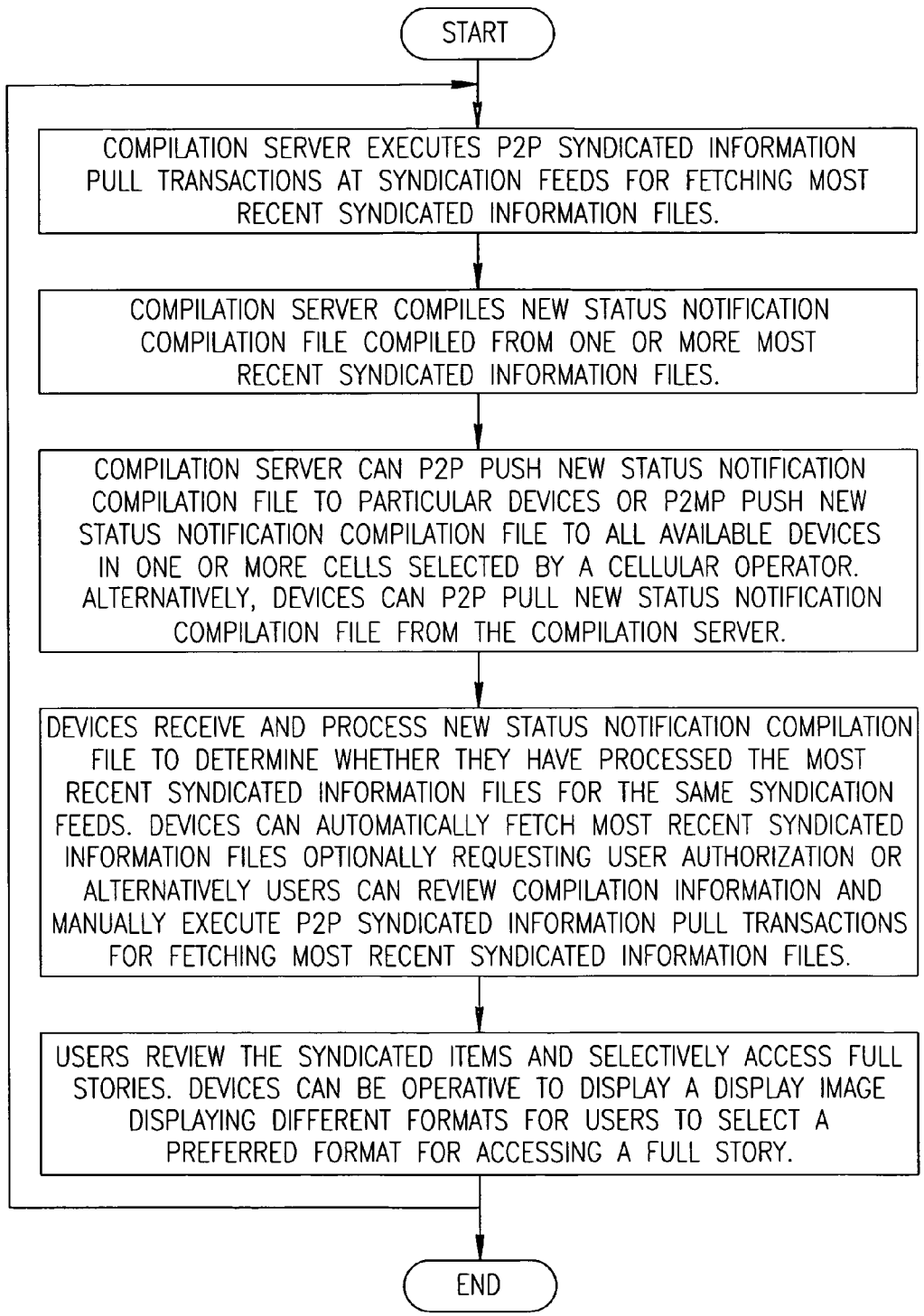
FIG. 8 is a flow diagram of a method for initiating consumption of web content from FIG. 4's status notification compilation file intended for either P2P pulling by particular devices or P2P pushing to particular devices or P2MP pushing to all available devices in one or more cells selected by a cellular operator.

FIG. 8 shows the steps for enabling consumption of web content from status notification compilation files intended for either P2P pulling by particular devices or P2P pushing to particular devices or P2MP pushing to all available devices in one or more cells selected by a cellular operator. The compilation server executes P2P syndicated information pull transactions at syndication feeds for fetching most recent syndicated information files. The compilation server preferably runs the same comparison check as in the case of syndicated items compilation files to determine whether the most recent syndicated information files contain new information with respect to the last fetched syndicated information files. However, in contrast to syndicated items compilation files, the compilation server preferably compiles new status notification compilation files after each comparison check indicating whether syndication feeds were updated or not, and possibly additional information, for example, how many syndicated items they contain. Alternatively, status notification compilation files can contain a list of syndication feeds which were updated since the last compilation. The compilation server can P2P push status notification compilation files to particular devices or P2MP push status notification compilation file to all available devices in one or more cells selected by a cellular operator. Alternatively, devices can pull status notification compilation files from the compilation server.

The devices may receive status notification compilation files which contain compilation information corresponding to syndication information which they have already received by virtue of the fact that users can still optionally invoke their devices to execute P2P syndicated information pull transactions in a conventional manner irrespective of whether they have or have not recently received a compilation file. Accordingly, the devices receive and process the status notification compilation files including comparing the update parameter for each syndication feed to the update parameter of its associated syndicated information file last processed by its feed reader functionality to determine whether one or more of the syndication feeds has a more recent syndicated information file than the last syndicated information file processed by them. In the negative, no further action is taken. In the affirmative, the devices can be operative in one of two operational modes as follows:

(a) The devices can automatically execute P2P syndicated information pull transactions for fetching the most recent syndicated information files from the relevant syndication feeds for processing in a conventional manner including displaying their syndicated items. The most recent syndicated information files can be fetched from the syndication feeds themselves or the compilation server. Optionally, the devices can request user authorization before executing the P2P syndicated information pull transactions.

(b) Alternatively, the devices can display a list of the syndication feeds which have more recent syndicated information files than the last syndicated information files processed by them together with their associated status information. Users can review the list of the syndication feeds and decide which most recent syndicated information files of the syndication feeds they are interested in and selectively fetch them for processing in a conventional manner including displaying their syndicated items. The most recent syndicated information files can be fetched from the syndication feeds themselves or the compilation server.

Users review the syndicated items and selectively execute P2P full story pull transactions for accessing full stories of the syndicated items of interest to them for rendering on their devices. The devices can be operative to display a display image for enabling users to select a preferred format for accessing a full story.

While the invention has been described with respect to a limited number of embodiments, it will be appreciated that many variations, modifications, and other applications of the invention can be made within the scope of the appended claims.

We claim:

1. Method for distributing web content to personal cellular telecommunications devices each having feed reader functionality for receiving and processing syndicated information files for displaying syndicated items on a display screen, each syndicated item having an embedded universal resource locator (URL) for accessing a full story, and browser functionality for accessing full stories in web page format, the method comprising the steps of:

(a) executing point-to-point (P2P) syndicated information pull transactions at least one syndication feed for fetching a corresponding number of most recent syndicated information files each containing syndicated information including syndicated items;

(b) compiling a status notification compilation file including a list of at least one syndication feed and status information regarding same; and (c) point-to-multi-point (P2MP) pushing the compilation file to all available personal cellular telecommunications device in at least one cell selected by a cellular operator for enabling determination at the personal cellular telecommunications devices whether their feed reader functionality has processed the most recent syndicated information files, thereby enabling users to selectively access full stories based on syndicated items of interest to them for rendering the full stories on their personal cellular telecommunication devices.

2. The method according to claim 1 wherein step (b) further includes compiling a syndicated items compilation file containing syndicated items compiled from the most recent syndicated information files available at least two different syndication feeds.

3. The method according to claim 2 wherein step (b) includes repeatedly compiling a syndicated items compilation file containing syndicated items compiled from the most recent syndicated information files available at the same at least two different syndication feeds irrespective of whether at least some of the most recent syndicated information files are identical to the last fetched syndication information files available at the same at least two different syndication feeds.

4. The method according to claim 2 wherein step (b) includes compiling a syndicated items compilation file containing only new syndicated items with respect to its immediately preceding compilation file.

5. The method according to claim 1 and further comprising the step of determining the value for an update parameter for a syndicated information file not provided with an update parameter at its syndication feed.

6. The method according to claim 1 wherein the status information includes at least an update time of each of the at least one most recent syndicated information file.

7. The method according to any one of claims 1, 5, and 6 wherein step (b) includes compiling consecutive status notification compilation files containing the same list of at least one syndication feed and status information regarding same.

8. The method according to any one of claims 1, 5, and 6 wherein step (b) includes compiling consecutive status notification compilation files containing a list of at least one syndication feed updated between consecutive compilations of compilation files.

9. The method according to any one of claims 1, 5, and 6 wherein a personal cellular telecommunications device's feed reader functionality automatically fetches a most recent syndicated information file available at a syndication feed which is more recent than the last fetched most recent syndicated information file from the same syndication feed that it processed.

10. The method according to claim 9 wherein the personal cellular telecommunications device's feed reader functionality requests user authorization prior to fetching a more recent syndicated information file available a syndication feed.

11. The method according to any one of claims 1, 5, and 6 wherein a personal cellular telecommunications device's feed reader functionality displays compilation information for user review prior to users selectively executing P2P syndicated information pull transactions for fetching more recent syndicated information files of syndication feeds of interest to them.

12. The method according to any one of claims 1-4, 5, and 6 wherein, in response to a P2P full story pull transaction for accessing a full story, further comprising the step of displaying a display image displaying at least two different formats including at least one non web page format for accessing the full story for enabling a user to select a preferred format for accessing the full story.

13. The method according to claim 12 wherein the at least one non web page format is from the list of: short messaging service (SMS), multimedia messaging service (MMS), and email.

14. Cellular telecommunications network operative for distributing web content to personal cellular telecommunications devices according to any one of claims 1-4, 5, and 6.

15. Personal cellular telecommunications device operative for accessing web content according to any one of claims 1-4, 5, and 6.

16. Smart card operable with a personal cellular telecommunications device so that the personal cellular telecommunications device is operative for accessing web content according to any one of claims 1-4, 5, and 6.

17. Computer program storage medium for enabling web content distribution according to any one of claims 1-4, 5, and 6.

18. Method for distributing web content to personal cellular telecommunications devices each having feed reader functionality for receiving and processing syndicated information files for displaying syndicated items on a display screen, the syndicated items each having an embedded universal resource locator (URL) for accessing a full story, and browser functionality for accessing full stories in web page format, the method comprising the steps of:
  (a) executing point-to-point (P2P) syndicated information pull transactions at least one syndication feed for fetching a corresponding number of most recent syndicated information files each containing syndicated information including syndicated items;
  (b) compiling a status notification compilation file including compilation information compiled from syndicated information from step (a) wherein the compilation information includes a list of at least one syndication feed and status information regarding same; and
  (c) transmitting the status notification compilation file to said personal cellular telecommunications devices for enabling determination at the personal cellular telecommunications devices whether their feed reader functionality has processed the most recent syndicated information files, thereby enabling users to selectively access full stories based on syndicated items of interest to them for rendering the full stories on their personal cellular telecommunication devices.

19. The method according to claim 18 and further comprising the step of determining the value for an update parameter for a syndicated information file not provided with an update parameter at its syndication feed.

20. The method according to claim 18 wherein the status information includes the update time of each of the at least one most recent syndicated information file.

21. The method according to any one of claims 18 to 20 wherein step (b) includes compiling consecutive status notification compilation files containing the same list of at least one syndication feed and status information regarding same.

22. The method according to any one of claims 18 to 20 wherein step (b) includes compiling consecutive status notification compilation files containing a list of at least one syndication feed updated between consecutive compilations of compilation files and status information regarding same.

23. The method according to any one of claims 18 to 20 wherein a personal cellular telecommunications device's feed reader functionality automatically fetches a most recent syndicated information file available at a syndication feed which is more recent than the last fetched most recent syndicated information file from the same syndication feed that it processed.

24. The method according to claim 23 wherein the personal cellular telecommunications device's feed reader functionality requests user authorization prior to fetching a most recent syndicated information file available at a syndication feed.

25. The method according to any one of claims 18 to 20 wherein a personal cellular telecommunications device's feed reader functionality displays compilation information for user review prior to users selectively executing P2P syndicated information pull transactions for fetching more recent syndicated information files of syndication feeds of interest to them.

26. The method according to any one of claims 18 to 20 and further comprising the step of a personal cellular telecommunications device pulling the status notification compilation file.

27. The method according to any one of claims 18 to 20 and further comprising the step of Point-To-Point (P2P) pushing the status notification compilation file to at least one particular personal cellular telecommunications device.

28. The method according to any one of claims 18 to 20 and further comprising the step of Point-To-MultiPoint (P2MP) pushing the status notification compilation file to all available personal cellular telecommunications devices in at least one cell selected by a cellular operator.

29. The method according to any one of claims 18 to 20 wherein, in response to a P2P full story pull transaction for accessing a full story, further comprising the step of displaying a display image displaying at least two different formats including at least one non web page format for accessing the full story for enabling a user to select a preferred format for accessing the full story.

30. The method according to claim 29 wherein the at least one non web page format is from the list of: short messaging service (SMS), multimedia messaging service (MMS), and email.

31. Cellular telecommunications network operative for distributing web content to personal cellular telecommunications devices according to any one of claims 18 to 20.

32. Personal cellular telecommunications device operative for accessing web content according to any one of claims 18 to 20.

33. Smart card operable with a personal cellular telecommunications device so that the personal cellular telecommunications device is operative for accessing web content according to any one of claims 18 to 20.

34. Computer program storage medium for enabling web content distribution according to any one of claims 18 to 20.

35. Method for distributing web content to personal cellular telecommunications devices each having feed reader functionality for receiving and processing syndicated information files for displaying syndicated items on a display screen, each syndicated item having an embedded universal resource locator (URL) for accessing a full story, and browser functionality for accessing full stories in web page format, the method comprising the steps of:
   (a) displaying a syndicated news item with an embedded URL for accessing a full story; and
   (b) in response to a point-to-point (P2P) full story pull transaction for accessing the full story, displaying a display image displaying at least two different display formats including at least one non web page format for accessing the full story for enabling a user to select a preferred format for accessing the full story.

36. The method according to claim 35 wherein the at least one non web page format is from the list of: short messaging service (SMS), multimedia messaging service (MMS), and email.

37. The method according to either claim 35 or 36 and further comprising the steps of:
   (c) executing point-to-point (P2P) syndicated information pull transactions at least one syndication feed for fetching a corresponding number of most recent syndicated information files each containing syndicated information including syndicated items;
   (d) compiling a compilation file including compilation information based on syndicated information from step (c); and
   (e) point-to-multi-point (P2MP) pushing the compilation file to all available personal cellular telecommunications device in at least one cell selected by a cellular operator prior to users selectively accessing full stories based on syndicated items of interest to them for rendering the full stories on their personal cellular telecommunication devices.

38. The method according to claim 37 wherein step (d) includes compiling a syndicated items compilation file containing syndicated items compiled from the most recent syndicated information files available at least two different syndication feeds.

39. The method according to claim 38 wherein step (d) includes repeatedly compiling a syndicated items compilation file containing syndicated items compiled from the most recent syndicated information files available at the same at least two different syndication feeds irrespective of whether at least some of the most recent syndicated information files are identical to the last fetched syndication information files available at the same at least two different syndication feeds.

40. The method according to claim 38 wherein step (d) includes compiling a syndicated items compilation file containing only new syndicated items with respect to its immediately preceding compilation file.

41. The method according to claim 37 wherein step (d) includes compiling a status notification compilation file containing compilation information including a list of at least one syndication feed and status information regarding same.

42. The method according to claim 41 and further comprising the step of determining the value for an update parameter for a syndicated information file not provided with an update parameter.

43. The method according to claim 41 wherein the status information includes at least an update time of each of the at least one most recent syndicated information file.

44. The method according to claim 41 wherein step (d) includes compiling consecutive status notification compilation files containing the same list of at least one syndication feed and status information regarding same.

45. The method according to claim 41 wherein step (d) includes compiling consecutive status notification compilation files containing a list of at least one syndication feed updated between consecutive compilations of compilation files and status information regarding same.

46. The method according to claim 41 wherein a personal cellular telecommunications device's feed reader functionality automatically fetches a most recent syndicated information file available at a syndication feed which is more recent than the last fetched most recent syndicated information file from the same syndication feed that it processed.

47. The method according to claim 46 wherein the personal cellular telecommunications device's feed reader functionality requests user authorization prior to fetching a more recent syndicated information file available at a syndication feed.

48. The method according to claim 41 wherein a personal cellular telecommunications device's feed reader functionality displays compilation information for user review prior to users selectively executing P2P syndicated information pull transactions for fetching more recent syndicated information files of syndication feeds of interest to them.

49. The method according to either claim 35 or 36 and further comprising the steps of:
   (c) executing P2P syndicated information pull transactions at least one syndication feed for fetching a corresponding number of most recent syndicated information files each containing syndicated information including syndicated items; and
   (d) compiling a status notification compilation file including compilation information compiled from syndicated information from step (c) wherein the compilation information includes a list of at least one syndication feed and status information regarding same prior to users selectively accessing full stories based on syndicated items of interest to them for rendering the full stories on their personal cellular telecommunication devices.

50. The method according to claim 49 and further comprising the step of determining the value for an update parameter for a syndicated information file not provided with an update parameter at its syndication feed.

51. The method according to claim 49 wherein the status information includes the update time of each of the at least one most recent syndicated information file.

52. The method according to claim 49 wherein step (d) includes compiling consecutive status notification compilation files containing the same list of at least one syndication feed and status information regarding same.

53. The method according to claim 49 wherein step (d) includes compiling consecutive status notification compilation files containing a list of at least one syndication feed updated between consecutive compilations of compilation files and status information regarding same.

54. The method according to claim 49 wherein a personal cellular telecommunications device's feed reader functionality automatically fetches a most recent syndicated information file available at a syndication feed which is more recent than the last fetched most recent syndicated information file from the same syndication feed that it processed.

55. The method according to claim 54 wherein the personal cellular telecommunications device's feed reader functionality requests user authorization prior to fetching a more recent syndicated information file available at a syndication feed.

56. The method according to claim 49 wherein a personal cellular telecommunications device's feed reader functionality displays compilation information for user review prior to users selectively executing P2P syndicated information pull transactions for fetching more recent syndicated information files of syndication feeds of interest to them.

57. The method according to claim 49 and further comprising the step of a personal cellular telecommunications device pulling the status notification compilation file.

58. The method according to claim 49 and further comprising the step of Point-To-Point (P2P) pushing the status notification compilation file to at least one particular personal cellular telecommunications device.

59. The method according to claim 49 and further comprising the step of Point-To-MultiPoint (P2MP) pushing the status notification compilation file to all available personal cellular telecommunications devices in at least one cell selected by a cellular operator.

60. Cellular telecommunications network operative for distributing web content to personal cellular telecommunications devices according to any one of claims 35 to 36.

61. Personal cellular telecommunications device operative for accessing web content according to any one of claims 35 to 36.

62. Smart card operable with a personal cellular telecommunications device so that the personal cellular telecommunications device is operative for accessing web content according to any one of claims 35 to 36.

63. Computer program storage medium for enabling web content distribution according to any one of claims 35 to 36.

* * * * *